United States Patent [19]

Hagen

[11] Patent Number: 5,313,355
[45] Date of Patent: May 17, 1994

[54] FLEXURE MOUNTING SYSTEM FOR HARD DISC DRIVES

[75] Inventor: Tracy M. Hagen, Edina, Minn.

[73] Assignee: Seagate Technology, Inc., Scotts Valley, Calif.

[21] Appl. No.: 977,944

[22] Filed: Nov. 17, 1992

[51] Int. Cl.⁵ .................. G11B 5/50; G11B 21/16
[52] U.S. Cl. .................................................. 360/104
[58] Field of Search ...................... 360/104–106, 360/98

[56] References Cited

U.S. PATENT DOCUMENTS

| 4,829,395 | 5/1989 | Coon et al. | 360/104 |
| 4,943,875 | 7/1990 | Reidenbach et al. | 360/104 |
| 4,947,275 | 8/1990 | Hinlein | 360/104 |
| 5,187,625 | 2/1993 | Blaeser et al. | 360/104 |

Primary Examiner—A. J. Heinz
Assistant Examiner—Brian E. Miller
Attorney, Agent, or Firm—Edward P. Heller, III

[57] ABSTRACT

A flexure support plate having a pair of half etched legs which insert into slots formed in the sides of an actuators arm. A pair of flexure support plates may be insert into a single slot thereby permitting close disc spacing.

6 Claims, 7 Drawing Sheets

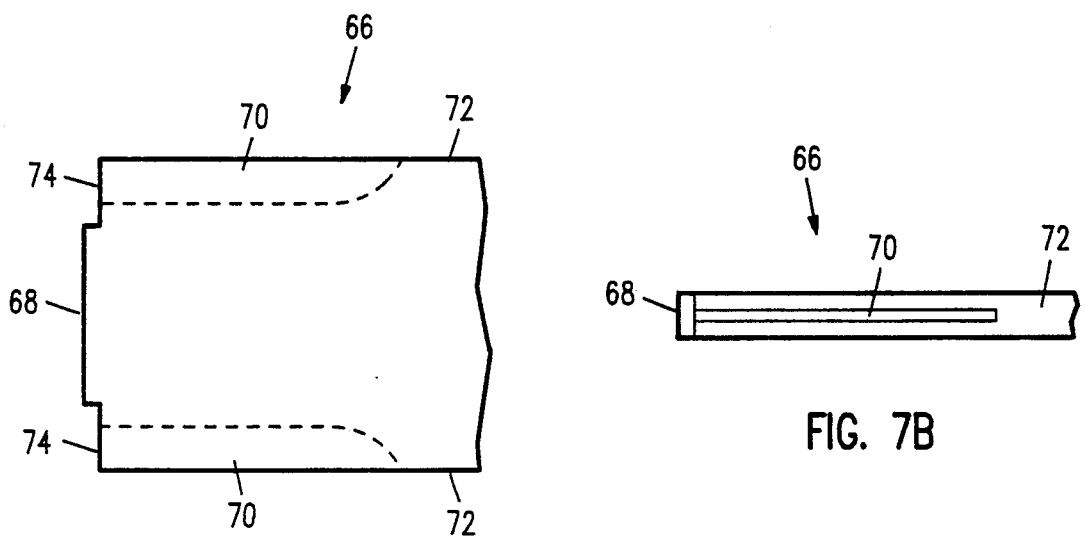
FIG. 7A
FIG. 7B
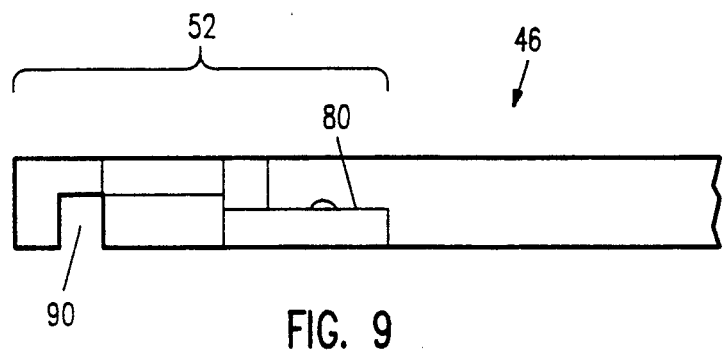
FIG. 9
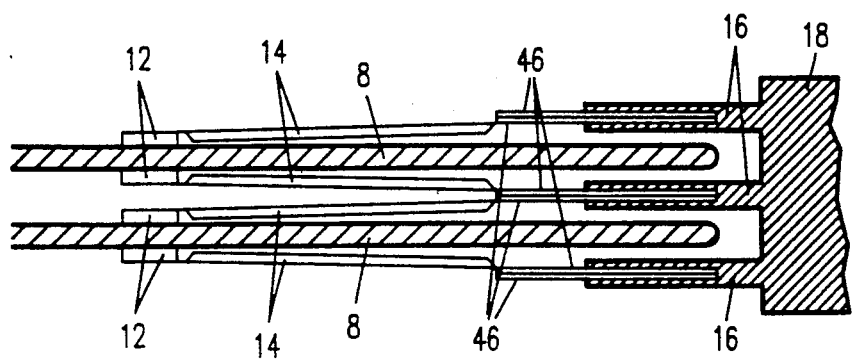
FIG. 10

FLEXURE MOUNTING SYSTEM FOR HARD DISC DRIVES

BACKGROUND OF THE INVENTION

1. Field of the Invention

This invention relates generally to the field of hard disc drives and more particularly, but not by way of limitation, to a system for attaching the head/flexure assemblies to mounting arms on the actuator of the disc drive.

2. Brief Description of the Prior Art

Disc drive data storage devices of the type known as "Winchester" disc drives are well known in the industry. Such disc drives incorporate one or more rigid discs coated with a magnetizable medium to store digital information on a plurality of circular, concentric tracks. The recording and retrieval of data—also referred to as writing and reading, respectively—is accomplished through the use of an electromagnetic transducer carried in a slider body having a self acting hydrodynamic air bearing which "flies" the device above the disc surface. This combination is sometimes referred to collectively as a head. An actuator is used to controllably move the heads from track to track, under control of electronic circuitry.

While the present invention is suitable for use with any type of actuator, the type of actuator most commonly used in hard disc drives of the present technology is the rotary voice coil actuator. In a rotary voice coil actuator, a voice coil motor (VCM) is coupled through a pivot mechanism to an array of vertically aligned heads. The pivot mechanism typically includes an actuator body with the VCM coil attached to one side and a plurality of head mounting arms projecting from the opposite side. The heads are mounted to the head mounting arms via flexures which encourage the heads into proper cooperative arrangement with the spinning discs and allow small variations in the roll and pitch attitudes of the heads to conform to minute variations in the disc surfaces. Such flexures are described in detail in U.S. patent application Ser. No. 07/975,352, filed Nov. 12, 1992, and assigned to the assignee of the present invention.

The above-cited application notes that many schemes have been set forth for mounting the flexure to the actuator in the disc drive, and that almost all involve the welding of the flexure—typically made of thin stainless steel—to a thicker, more substantial mounting plate. This is because the thin material of the flexure itself is usually not adequate to absorb the types and amounts of stresses needed to securely attach the flexure to the actuator.

One type of common prior art scheme used to mount the flexure to the actuator using one or more machine screws or bolts to attach the mounting plate of the flexure to the head mounting arm of the actuator. Such a method is described in U.S. Pat. No. 4,167,765 (Watrous), and is advantageous in applications where head/gimbal assembly (HGA) failures occur frequently during manufacturing testing of the disc drive and HGA replacement is common. This type of attachment scheme does have several drawbacks:

1. it is generally expensive, due to the costs associated with drilling and tapping threaded holes in the head mounting arm and the cost of miniature machine screws,
2. it generally requires that the head mounting arms be of a design wherein the arms themselves must be attached to the actuator body using screws, further increasing cost and complexity of assembly,
3. it is commonly susceptible to unacceptable variations in geometry brought about by differential thermal expansion across the temperature range specified for the disc drive, and
4. it is generally unsuitable for applications in which the spacing between the discs is small since the heads of the screws tend to contact the disc surfaces.

Another type of head mounting widely used is the "swage mount", such as that described in U.S. Pat. No. 4,875,117 (Slezak, Levy). In such a scheme, the mounting plate that is welded to the flexure includes a hollow, cylindrical protrusion, called a "boss" on one side. The boss fits intimately into a hole in the head mounting arm, and a staking ball—or similar device—is forced through the boss to deform the boss outwardly into contact with the inner surface of the hole in the head mounting arm. This type of design eliminates the need for removable head mounting arms, as well as the tapped holes and miniature machine screws, the lack of which is desirable in low cost disc drives. However, the mounting plate itself can be excessively expensive. Strong, high quality mounting plates must be made on screw machine lathes. Plates made on a stamping press are less expensive, but more prone to excessive distortion during the swaging process, and this distortion may change the intended force the flexure is to furnish against the slider, which will in turn affect the flying height of the slider and the reliability of the disc drive. Moreover, such distortion can lead to high stresses which will cause cracking of the mounting plate, the head mounting arm, or both. Furthermore, removal of HGAs from the head mounting arms is difficult with this type of design, and the head mounting arm throughhole is deformed during the swaging process. Lastly, this design, too, does not lend itself to applications where disc-to-disc spacing is small. The mounting plate bosses must be of a certain minimal length to ensure adequate overlap of the boss and head mounting arm material, the head mounting arm must be of sufficient thickness for adequate strength should such flaws as casting porosity be present in the arm, and the "stacking" of the mounting plates on top and bottom of the head mounting arm adds vertical height.

An alternative swage mounting scheme has been suggested in U.S. patent application 07/639,136, filed Jan. 1, 1991 abandoned, now continuation application Ser. No. 07/925,324, filed Aug. 6, 1992, where separate holes in the head mounting arm are provided for the HGAs on opposite sides of the head mounting arm, but the cost of the increased complexity of the mounting plate argues against this scheme.

Attachment of the flexure to the head mounting arm by adhesives has also been attempted, but is not favored due to the variability of adhesive quality and the tendency of the HGAs to "drift" on the head mounting arm, resulting in mis-registration of the head transducers relative to the data tracks.

Attachment of the flexure to the head mounting arm by one or more rivets has been described in U.S. Pat. 4,783,710 (Salyer, Toor) and IBM Technical Disclosure Bulletins volume 28, number 6, page 2453 and volume 29, number 1, page 256. These types of mounting schemes are similar to the screw types described above, except the screws have been replaced with less expensive rivets. This reduces cost, but makes replacement of HGAs more difficult and as a result is less widely used.

It has also been proposed to weld the flexure directly to the head mounting arm but, in general, this cannot be done, since the flexures are typically made from 300 series stainless steel and the head mounting arms are commonly either aluminum or magnesium. While the head mounting arms could be made of stainless steel to facilitate such welding, this would greatly increase the mass and inertia of the actuator, resulting in a slower movement of the heads from track to track.

Elimination of the mounting plate has also been investigated but abandoned, since it has been found that, to maintain an invariant flexure force through the various steps in manufacturing, it is best to have the flexure welded to a stiff, rigid plate.

Therefore, it can be seen that a low cost, easily manufactured mounting scheme for mounting the flexure to the head mounting arms is desirable, and such a mounting scheme would be of the greatest benefit if it also contributed to the minimization of the disc-to-disc spacing in a disc drive.

SUMMARY OF THE INVENTION

The flexure mounting scheme of the present invention includes a mounting plate, fabricated using the processes of etching and half-etching, which is attached to the flexure by welding. The mounting plate includes a pair of legs extending away from the flexure and intended to engage with a pair of slots formed in the lateral surfaces of the head mounting arms of the disc drive actuator. Back-to-back mounting of a pair of HGAs is facilitated by dimensioning the slots in the head mounting arms to accept such a pairing. In one aspect of the invention, such back-to-back mounting of a pair of HGAs also incorporates a wire routing feature to assist in properly dressing the wires used to connect the head to the disc drive read/write electronics.

It is an object of the invention to provide a mounting scheme for attaching a head-carrying flexure to the head mounting arms of a disc drive actuator which facilitates minimal disc-to-disc spacing within the disc drive.

It is another object of the invention to provide a mounting plate that is inexpensive to produce and lends itself particularly well to mass production.

It is another object of the invention to provide a mounting plate which contributes to the ease and accuracy with which mounting plates are welded to flexures.

It is another object of the invention to provide a mounting scheme for attaching a head-carrying flexure to the head mounting arms of a disc drive actuator which allows the simple and non-destructive removal of the flexure from the head mounting arm should replacement of the flexure be required.

It is another object of the invention to provide a mounting plate which is resistant to distortion and deformation during attachment to the head mounting arm, thereby maintaining the correct load force relationship between the flexure and the head.

It is yet another object of the invention to provide a flexure mounting scheme in which the mounting plate and head mounting arm include self-alignment features which ensure the proper relationship between the flexure and the actuator, to ease assembly and maintain proper vertical alignment of the transducers in the disc drive.

BRIEF DESCRIPTION OF THE DRAWINGS

The features, benefits and objects of the invention, as well as those inherent therein, can be best understood from the following detailed description of the invention when read in conjunction with the following drawings.

FIGS. 7A and 7B are partial plan and elevation views, respectively, of the head mounting arm which forms a part of the flexure mounting scheme of the present invention.

FIG. 9 is a partial elevation view of the mounting plate which is a part of the present invention.

FIG. 10 is a partial sectional view of the flexure mounting scheme of the present invention.

DETAILED DESCRIPTION OF THE INVENTION

Figure 1:
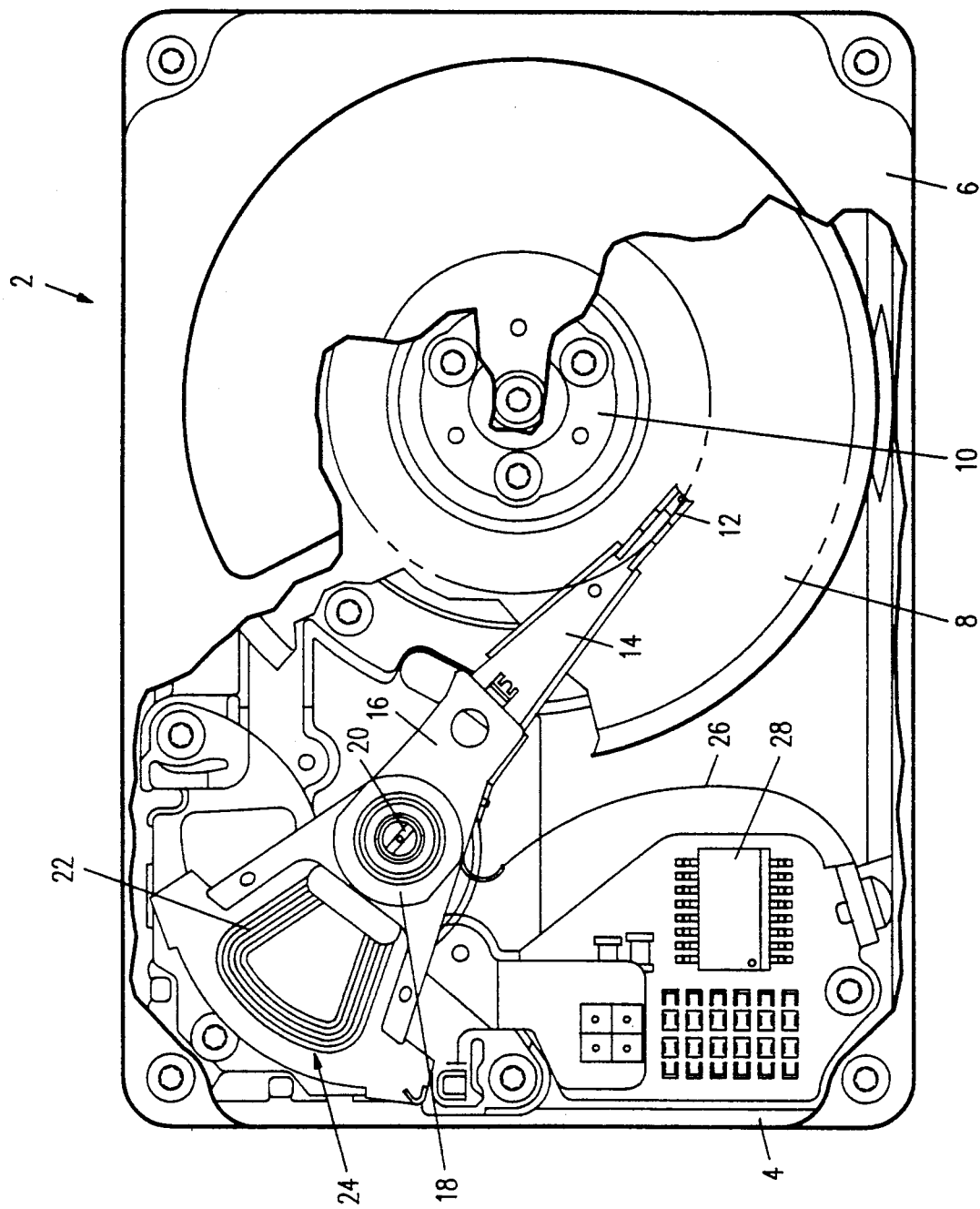
FIG. 1 is a plan view in partial cutaway of a disc drive in which the present invention is particularly useful.

Turning now to the drawings and more specifically to FIG. 1, shown is a disc drive 2 of the type in which the present invention is particularly useful. The disc drive 2 consists of a base member 4 to which the remainder of the components are either directly or indirectly mounted. A top cover 6 interacts with the base member 4 to provide a sealed environment to prevent the entry of outside contaminants which could cause damage to the delicate internal components. At least one disc 8 is mounted for rotation on a spindle motor (not shown) and secured to the motor by a disc clamp 10. An array of vertically aligned heads, one of which is shown at 12, is mounted on a corresponding arrangement of flexures 14, which are each in turn fastened to a head mounting arm 16. The head mounting arms form a part of an actuator body 18 adapted to pivot about a pivot shaft 20. The actuator body 18 is also fixedly attached to the coil 22 of a voice coil motor (VCM), show generally at 24. Signals to drive the VCM 24, as well as read and write signals from and to the heads 12, are carried to and from the moving actuator via a printed circuit cable (PCC) 26. Such signals are generated and/or sensed by electronic circuitry, shown partially at 28. As the coil 22 is moved, the actuator body 18 pivots about the pivot shaft 20, in turn moving the heads 12 from track to track on the surface of the disc 8.

In such a disc drive, it is highly desirable to minimize the spacing between adjacent discs 8, or inter-disc spacing, in order to either allow the use of more discs within a defined physical envelope—and thus increase the data capacity of the disc drive—or, alternatively, decrease the physical height of the disc drive without lessening the data capacity. In order to bring the discs closer together, the height of the head/gimbal assembly (HGA) components has been reduced. Indeed, in U.S. Pat. application 07/639,136, abandoned, now Ser. No. 07/425,324 filed 8/06/1992, cited above, a low profile flexure assembly is disclosed which permits inter-disc spacing limited substantially only by the mechanism used to attach the head/flexure assembly to the actuator.

Figure 2:
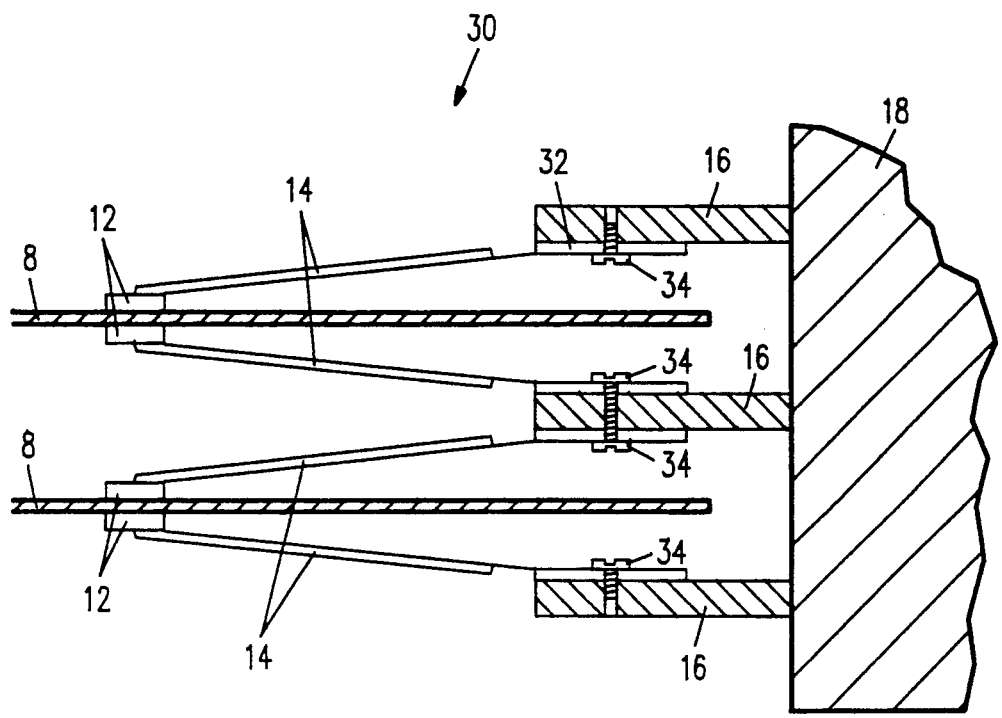
FIG. 2 is a partial sectional view of a first prior art mechanism for attaching head-carrying flexures to the head mounting arms of a disc drive actuator.

Turning now to FIG. 2, shown is a sectional view of a prior art flexure mounting scheme which uses bolts or machine screws. In this and subsequent figures a disc drive is assumed which includes two discs 8 and a total of four heads 12, although the present invention is in no way limited to use in such a unit, and is advantageous in disc drives having both a lesser and greater number of discs and heads.

In FIG. 2, an actuator body 30 is provided which is driven by an actuator motor (not shown) to move an array of heads 12 across the surfaces of discs 8. Connected to each head 12 is a flexure 14 which allows compliance for the head 12 to follow minor variations in the surface of the discs 8 and applies a "downward" force—toward the disc surfaces—to balance the force of the hydrodynamic air bearing and fly the heads 12 at the desired height above the disc surfaces. At the opposite ends of the flexures 14 from the heads 12, the flexures 14 are welded to mounting plates, one of which is designated 32 in the figure. These mounting plates 32 are typically formed of stainless steel that is substantially thicker than the material of the flexure 14 itself. Each of the head/flexure/mounting plate assemblies 12/14/32—collectively referred to as a head/flexure assembly—is secured to a head mounting arm 16 by use of a miniature machine screw 34.

It is readily apparent that, in order to gain access to all of the screw heads, the head mounting arms 16 have to be separate components as shown in the figure, and individually fastened in turn to the actuator body 18 by some additional fastening apparatus (not shown). It is equally evident that the amount by which the vertical height of the head mounting arms 16 can be reduced is limited by the necessity of providing adequate thread length for the screws 34, and necessary material strength to torque these screws to a point strong enough to hold the head/flexure assemblies rigidly in place. The separation of the discs 8 is also limited by the heads of the screws 34, which cannot be allowed to contact the disc surfaces.

Figure 3:
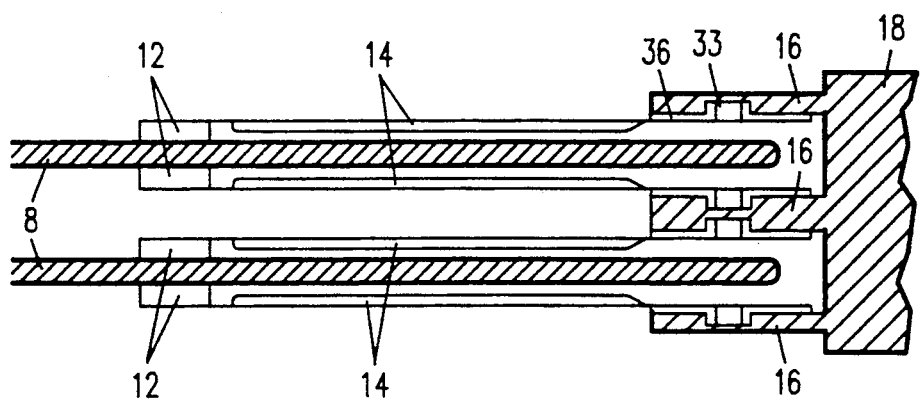
FIG. 3 is a partial sectional view of a second prior art mechanism for attaching head-carrying flexures to the head mounting arms of a disc drive actuator.

FIG. 3 shows another type of prior art flexure mounting scheme known as "swage mounting". The configuration of the disc drive shown in FIG. 3 is similar to that of FIG. 2, i.e., two discs 8, four heads 12 with attached flexures 14. An actuator body 18 and head mounting arms 16 are similar to those of FIG. 2, but, instead of mounting the flexures with screws, the flexures are swaged to the head mounting arms. In this example, the mounting plates 36 include a hollow, cylindrical boss 38 which is inserted into a complementary hole (not designated) in the head mounting arm 16. This operation is accomplished using a fixture (not shown) to hold all flexures in place while a staking ball, or similar tool, (also not shown) is forced through all the bosses 38, spreading the bosses into intimate contact with the holes in the head mounting arms 16. Since all of the flexures can be swaged with a single pass of the swaging tool, the head mounting arms 16 can be an integral part of the actuator body 18 as shown. The elimination of the screws further lowers the cost of this type of flexure attachment, and allows the head mounting arms 16 to be brought into closer relationship with the discs 8. However, the head mounting arms 16 must still be of a certain minimum thickness in order to ensure adequate strength in the swaging area, and to prevent fracturing of the head mounting arms 16 or bosses 38 during the swaging operation. Indeed, as can be seen in FIG. 3, any head mounting arm 38 which must mount more than one head/flexure assembly—as is the case with the middle head mounting arm of FIG. 3—must be substantially thickened to allow for two bosses 38 to meet end-to-end in the head mounting arm 16, thus limiting the reduction in disc-to-disc spacing.

Another drawback to the flexure attachment mechanism of FIG. 3 is that, when the swaging tool is forced through the bosses 38, the swaging operation acts in opposite directions on upward-facing and downward-facing flexures. For instance, if it is assumed that the swaging is accomplished by forcing a tool downward through the bosses as illustrated, the top boss is placed in compression as the tool moves downward, while the second boss will be placed in tension—or stretched—as the swaging tool passes downward, and so on as the tool completes its path through all the bosses in the assembly. This tends to cause the "grip" developed between the bosses and the head mounting arm to vary significantly between upward-facing and downward-facing flexures.

Figure 4:
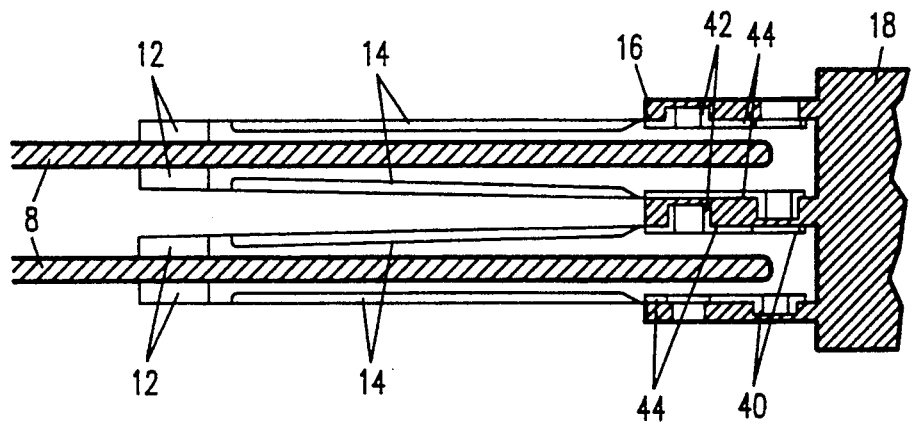
FIG. 4 is a partial sectional view of a third prior art mechanism for attaching head-carrying flexures to the head mounting arms of a disc drive actuator.

FIG. 4 shows another prior art scheme for attaching flexures to head mounting arms. This is another swage mount and is described in detail in previously cited U.S. patent application No. 07/639,136, abandoned, now Ser. No. 07/925,324 filed Aug. 6, 1992. An examination of FIG. 4 reveals that the swage bosses 40 for upward-facing head/flexure assemblies are all vertically aligned with one another, while the swage bosses 42 for all downward-facing head/flexure assemblies are vertically aligned in a separate location. Such a scheme alleviates some of the disadvantages of the scheme of FIG. 3, since the head mounting arms that mount two flexure assemblies no longer have to be thicker, because the bosses no longer meet end-to-end. Also, the swaging operation is now a two-step process, with the swaging tool passing downward through the bosses 40 of the upward-facing flexures and upward through the downward-facing flexures. This type of flexure mounting does, however, require that additional complexity be incorporated in the design of the mounting plates 44 and the head mounting arms 16, since a clearance hole must be provided in each of these components for the passage of the swaging tool in those locations where swaging is not performed. Furthermore, this scheme, as all others discussed above still requires that the mounting plates be stacked on the upper and/or lower surfaces of the head mounting arms 16, which definitively limits the amount of height reduction achievable with these designs.

Figure 5:
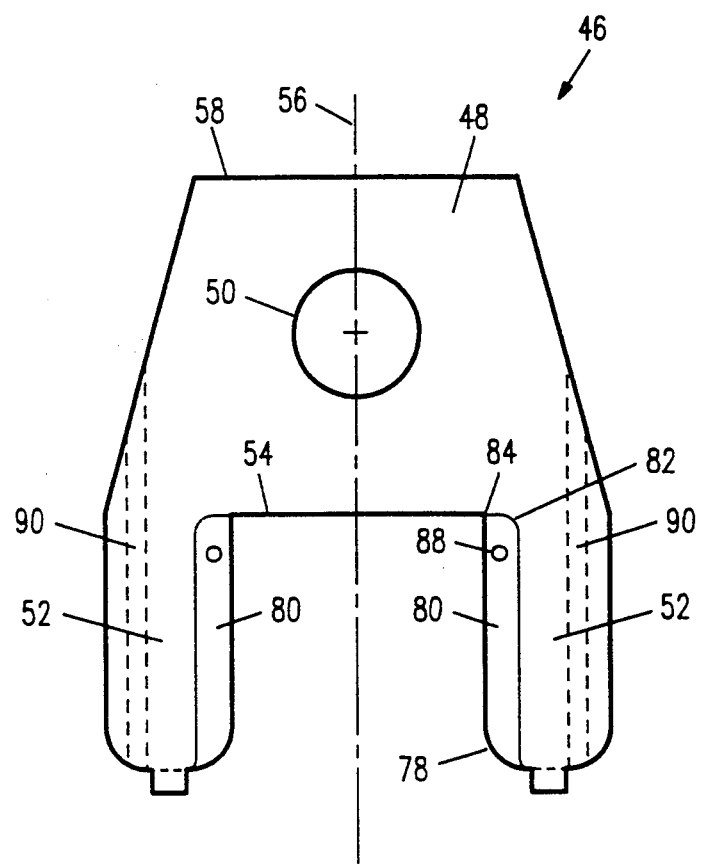
FIG. 5 is a plan view of the mounting plate that forms a part of the flexure mounting scheme of the present invention.

Turning now to FIG. 5, shown is a plane view of a mounting plate 46 made in accordance with the present invention, and which forms a part of the flexure mounting scheme of the present invention. As can be seen, the mounting plate 46 includes a main portion 48 that is trapezoidal in shape with a fixture alignment hole 50 in its center, and a pair of lateral legs 52 that extend from the major base 54 of the trapezoidal main portion 48 in parallel with the longitudinal centerline 56 of the mounting plate 46. The fixture alignment hole 50 is used to precisely align the mounting plate with a flexure (not shown) during the welding of these two components together. The mounting plate 46 is preferably made from full hardened 300 series stainless steel which is 0.0055 inches thick. In an embodiment anticipated by the inventor, the trapezoidal main portion 48 has a height of 0.200 inches, a minor base 58 with a length of 0.200 inches and a major base 54 with a length of 0.300 inches. The lateral legs are 0.150 inches long and 0.075 inches wide.

It is well known that chemical etching methods that employ etchants such as ferric chloride are capable of etching 0.0055 inch thick stainless steel. It is also well known that this chemical etching process is capable of reducing the thickness of certain regions in the material using a process called "half-etching". In this half-etching process, only one side of the material is exposed to the etchant, and the thickness of the material is reduced by about 60 percent in such areas.

In the mounting plate 46 of the present invention, this half-etching process is used to reduce the thickness of the lateral legs 52 along the sides of the legs closest to the longitudinal centerline 56 to a thickness of, for instance, 0.0022 inches over a width of 0.025 inches along the entire length of the lateral legs 52. The function of this half-etched, or relieved area 80, will be discussed below.

Figure 6:
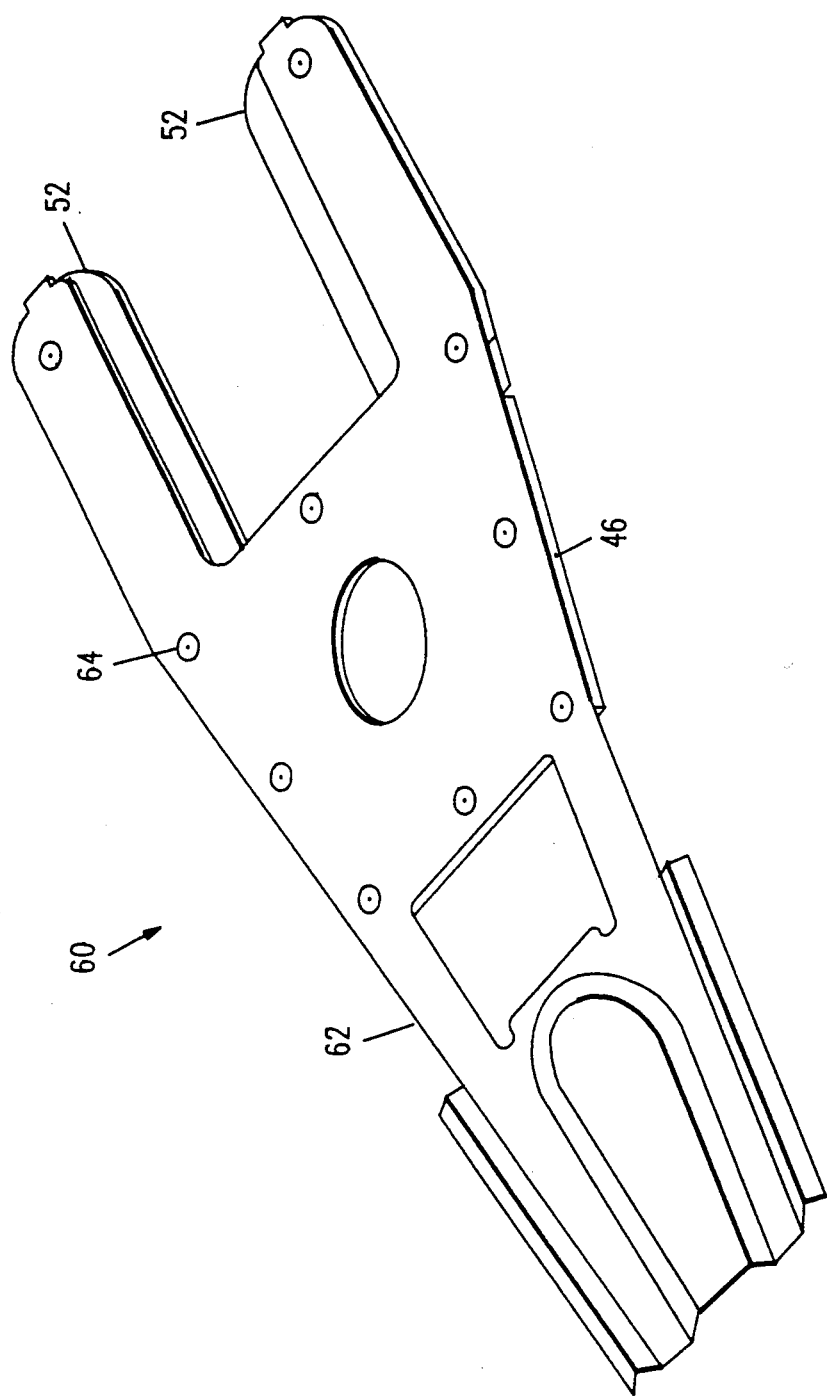
FIG. 6 is a partial perspective view of a flexure/mounting plate assembly made in accordance with the present invention.

FIG. 6 is a partial perspective view of a flexure/-mounting plate assembly 60 made in accordance with the present invention. As an example, the flexure shown is of the type disclosed in previously cited copending U.S. patent application Ser. No. 07/175,352, filed Nov. 12, 1992. During assembly, the flexure 62 is laser welded to the mounting plate 46 on the side of the mounting plate 46 from which material has been half-etched from the lateral legs 52. That portion of the flexure 62 which overlaps the mounting plate 46 is substantially identical in outline to the top surface of the mounting plate 46, and the laser spot welds are located around the periphery and corners of the mounting plate, as shown by the circles, one of which is designated 64.

FIGS. 7A and 7B show the configuration of the head mounting arm 66 which forms a part of the present invention. FIG. 7A is a partial plan view of the head mounting arm 66, while FIG. 7B is a corresponding partial elevation view. As the figures show, the head mounting arm 66 is substantially square at its free end 68 and a slot 70 is formed in the lateral edges 72. If the example dimensions cited above for the mounting plate 46 of FIG. 5 are assumed, the slots 70 would have a vertical height of 0.0050 inches—or approximately twice the thickness of the half-etched portion 80 of the lateral legs 52 of the mounting plate 46—a depth of 0.030 inches—or slightly deeper than the half-etched portion 80 of the lateral legs 52 of the mounting plate 46—and a length of 0.200 inches. The overall width of the free end 68 of the head mounting arm 66 is 0.200 inches and the head mounting arm itself has a vertical thickness of approximately 0.030 inches or less. The free end 68 of the head mounting arm 66 also includes a pair of relief notches 74, the function of which will be explained below.

Figure 8:
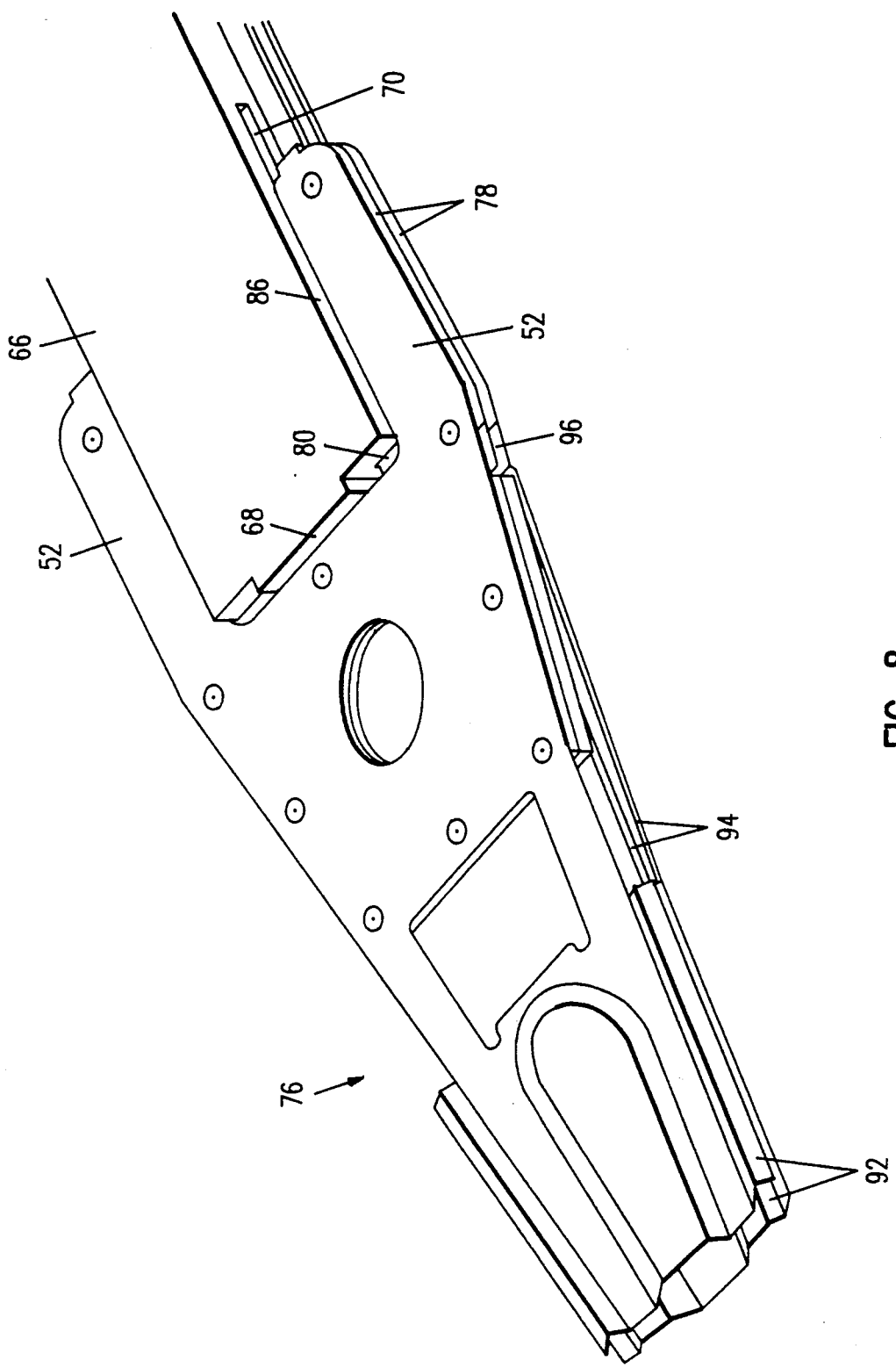
FIG. 8 is a partial perspective view of a pair of flexures and a head mounting arm made and assembled together in accordance with the present invention.

FIG. 8 is a partial perspective view showing how the head mounting arm 66 and the flexure assembly 76 are brought together. During assembly of the head positioner device, a pair of flexures 76 are placed back-to-back, i.e., with their mounting plates 78 in contact. The pair of flexures 76 is then slid onto the end of the head mounting arm 66 with the half-etched portions 80 of the lateral legs 52 engaging the slot 70, until the flexure 76 contacts the free end 68 of the head mounting arm 66. The locational alignment of the flexure 76 in relation to the head mounting arm 66 can be controlled exceptionally well if the width of the head mounting arm 66 is held to close tolerances, and if the dimension defining the overall width of the half-etched areas 80 on the lateral legs 52 is likewise held to close tolerances and is slightly larger than the overall width of the head mounting arm 66. For instance, if the overall width of the head mounting arm 66 is set at 0.199±0.001 inches and the overall dimensional extent of the half-etched areas 80 of the lateral legs 52 is set at 0.200±0.001 inches, the fit between the two parts will maintain the proper alignment of the assembly.

It is also apparent that this scheme for flexure mounting allows for the simple, non-destructive removal of defective HGAs, should such defective parts be diagnosed during manufacture or repair of the disc drive.

In order to facilitate the assembly of the flexure onto the head mounting arm several features have been included in the design of the mounting plate. Returning for a moment to FIG. 5, it is apparent that the insertion end 78 of the half-etched portion 80 of the lateral legs 52 has been generously radiused. This feature will aid in easing the insertion of the back-to-back pair of flexures into the slots 70 in the head mounting arm 66. It is also evident that the corners 82 and 84 where the lateral legs 52 attach to the major base 54 of the mounting plate 46 are also slightly radiused. It is for this reason that the free end 68 of the head mounting arm 66 incorporates the relief notches 74, as mentioned in the discussion of FIG. 7 above. With the relief notches 74 in the free end 68 of the head mounting arm 66, there is no unwanted interference to inhibit the proper seating of the flexure 76 on the head mounting arm 66.

Returning now to FIG. 8, in order to ensure that the fit between the head mounting arm 66 and the flexure is tight enough to hold the flexures 76 to the head mounting arm 66, two different methods of mounting the flexures 76 are proposed. As a first alternative, the lateral edges 86 of the head mounting arm 66 above and below the slot 70 are pinched toward each other prior to the insertion of the flexure 76 to ensure an adequate pressure fit. The second alternative can be best understood by returning to FIG. 5.

During the etching process which produces the mounting plate 46 and further half-etches the inner edges 80 of the lateral legs 52, a pair of contact points 88 are isolated from the half-etching process. This is done by leaving a very small diameter spot (less than 0.002 inches in diameter) of photoresist within the relieved region 80. During etching, the photoresist spot prevents etching from occurring at that point. However, a certain amount of unavoidable undercutting occurs during etching which eventually removes most of the material under the spot, resulting in a "bump" on the half-etched relieved region 80. During installation of the flexure 76 to the head mounting arm 66 this bump, or contact point 88, provides an interference fit between the two parts.

In some cases it may be desirable to apply a small amount of adhesive along the mounting-plate-to-head-mounting-arm joint in order to increase the margin of safety of the mounting attachment.

Yet another aspect of the invention is the incorporation of wire routing channels in the mounting plates. This aspect of the present invention is shown in FIG. 5 and in FIG. 9, which is a partial elevation view of the mounting plate 46 as viewed from the distal end of the lateral legs 52. As the figures show, a pair of wire routing channels 90 are half-etched into the lateral legs 52 of the mounting plate 46 on the side of the lateral legs 52 which is opposite to the half-etched relieved region 80 on the inner edge of the lateral legs 52. These wire routing channels 90 are substantially parallel to the longitudinal centerline 56 of the mounting plate 46, and, in the example being shown, are envisioned to be approximately 0.010 inches in width. It is easy to visualize that, if two such mounting plates are placed back-to-back, an enclosed "tube" will be formed. This wire routing channel 90 is used to guide the path of the lead wires for the read/write head mounted on the flexure, as can best be seen by referring to FIG. 8.

As can be seen in FIG. 8, each of the flexures 76 includes a pair of channels 92 formed in the lateral edges of the rigid beam portion of the flexure 76. These channels 92 not only contribute to the desired "stiffness" of the rigid beam portion of the flexure 76, but also create a location for routing the wires 94 which connect the head (not shown) to the read/write electronics (also not shown). Keeping in mind that one of the primary objectives of the present invention is to reduce the disc-to-disc spacing in a disc drive, support of these wires 94 is critical to prevent contact between the wires 94 and the surface of the discs (not shown). The channels 92 in the flexures 76 stop well short of the head mounting arms 66 and the wires 94 must be connected to termination points that are well out of the view of FIG. 8. To prevent these wires from "drooping" onto the surface of the discs, the wires are routed through the tube 96 formed by the wire routing channels 90 in the back-to-back mounting plates 78. Since the wire routing channels 90 are formed during the same etching process used to fabricate the rest of the mounting plate, the only cost associated with their incorporation is the one-time cost of preparing the mask artwork.

Turning now to FIG. 10, shown is a partial sectional view of the flexure mounting system of the present invention. As the figure shows, the present invention allows the head mounting arms 16 to be placed in much closer proximity to the discs 8 than was possible with any of the prior art flexure mounting schemes discussed in relation to FIGS. 2 through 4, in turn allowing significantly closer spacing of the discs 8 themselves. This is brought about primarily because the mounting plates 46 of the flexure 14 are located within the vertical space occupied by the head mounting arms 16. It should be noted that, while the middle of the three head mounting arms shown does indeed mount a pair of flexures 14, the top and bottom head mounting arms 16 each support only a single flexure 14. It is anticipated that on head mounting arms which mount a single flexure, a bare mounting plate 46 would be placed back-to-back with a complete flexure assembly and inserted in the slot (not designated) in the head mounting arm 16. Such a practice allows for uniformity of the dimensions of the head mounting arms 16. It is realized, however, that it is also possible on those head mounting arms 16 which mount a single flexure, for the head mounting arm 16, along with the associated slot in the lateral edge, to be made correspondingly thinner, thus providing another small but potentially significant reduction in vertical height.

Figure 11:
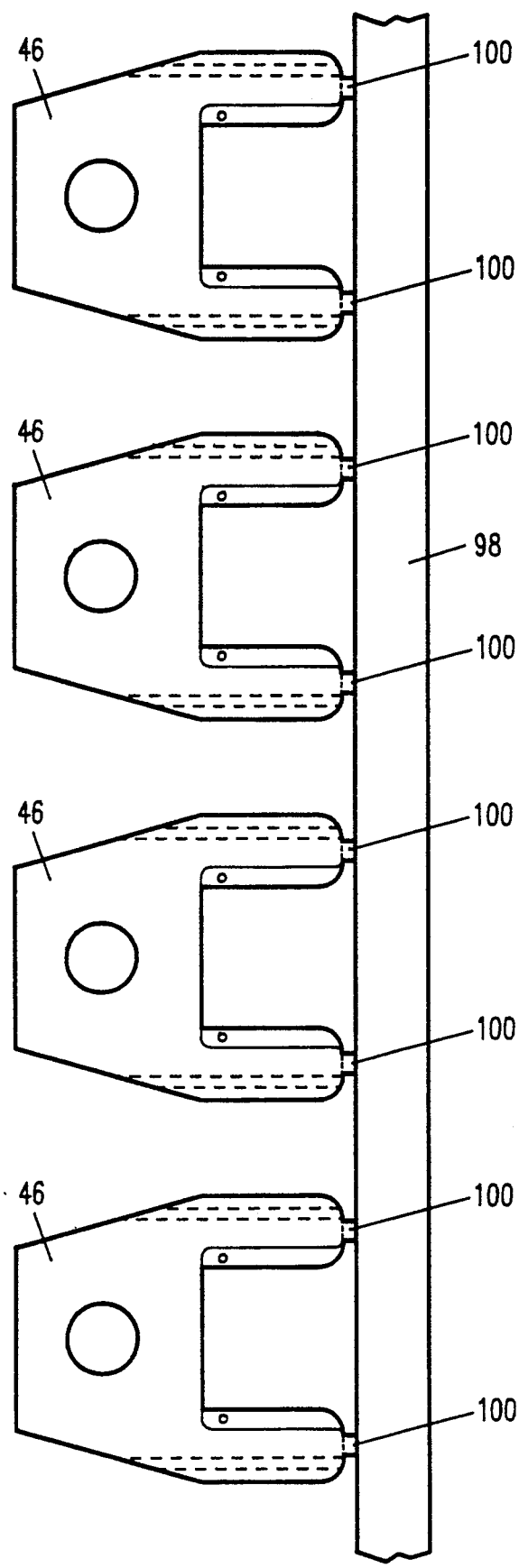
FIG. 11 is a plan view illustrating an aspect of the present invention as it relates to mass production of the invention.

The etched mounting plate of the present invention has the advantages of being economical to manufacture, since the process of etching is well-suited to automation and high volume production. Yet another advantage of the mounting plate of the present invention can be seen by studying FIG. 11. FIG. 11 shows a number of mounting plates 46 all attached to a carrier strip 98. Since the mounting plates are fabricated using the process of chemical etching, it is a relatively inexpensive task to replicate the artwork for the photoresist masking process several times over, and thus etch multiple mounting plates with a single "dip" of the masked material. By further masking off an area of the material to form a carrier strip 98, the mounting plates are kept connected to one another and can be more easily handled as a group. the point at which each individual mounting plate 46 is connected to the carrier strip 98 can also be half-etched, as shown by the dotted lines 100, to facilitate the removal of the mounting plates 46 from the carrier strip 98. This can be of particular significance during the welding of the mounting plates 46 to the flexures (not shown). In welding prior art flexures, it was necessary to individually load mounting plates one-by-one into welding fixtures, which was the most time-consuming operation at welding. With etched mounting plates made as shown in FIG. 11, it is possible to load an entire "strip" of mounting plates in one operation, thereby making the welding operation easier and less prone to operator error. Further, since the flexures are made using the same chemical etching process, the two components can be etched with identical spacing between adjacent components, allowing the mating of an entire strip of flexures to an entire strip of mounting plates. Furthermore, manufacturing the flexures and the mounting plates using the same process allows the manufacturer to reduce start-up costs when starting to manufacture a new design, and facilitates the coordination of pieceparts inventory to improve the manufacturer's ability to maintain low work-in-progress inventories and employ just-in-time material inventory management.

The use of mounting plates manufactured using the chemical etching process has yet another advantage over the use of mounting plates formed by machining or stamping. It has been found that the pre-load force of a flexure assembly is dependent on the location of the mounting plate relative to the load beam/gimbal assembly, and is also dependent on the location of the welds fastening the two components together. It is very desirable to minimize this variability. However, to manufacture prior art flexures, it was found that precise location of the mounting plate relative to the load beam/gimbal assembly was not achievable in high volume manufacturing because the prior art mounting plates had to be individually loaded into weld fixtures, as noted above. In order to load quickly, it is necessary that they load easily and with little effort, and, by design, that the mounting plates be loaded on locational pins that were not the same pins used to locate the load beam/gimbal assembly. In addition, the prior art mounting plates often have edges that are substantially radiused or chamfered, and such radii and chamfers are an additional cause of pre-load variability. In contrast, the mounting plates made by chemical etching are easier to align to load beam/gimbal assemblies during flexure welding since the fixture pins used to align the load beam/gimbal strip can also be used to align the mounting plate strip. Also, the edges of the etched mounting plate are square and crisp, thus improving pre-load consistency.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive data storage device comprising at least one disc member and an array of heads mounted to flexures for encouraging the heads into cooperative engagement with the disc member, the disc drive data storage device comprising an actuator for moving the heads to desired locations on the surfaces of the disc member and the actuator comprising a plurality of head mounting arms, each arm having top, bottom and lateral side surfaces and a proximal end to which flexures are mounted, wherein the invention comprises:

a system for mounting the flexures to the head mounting arms comprising:

mounting plates fastened to the flexures, the mounting plates comprising a pair of elongated lateral legs extending substantially parallel with a longitudinal centerline of the mounting plates and in a direction away from the heads, each of said lateral legs being substantially planar, lying in a common plane and having edges parallel to said centerline wherein the edges the edges of said legs closest to said centerline comprising facing edges; and a pair of slots the lateral surfaces of the head mounting arms, the slots with one slot in each of extending parallel to the centerline and to the proximal end of the arm;

a respective leg of said pair of legs being mounted in a corresponding of said slots, with substantially the entire length of a facing leg edge lying within a slot;

whereby the mounting plate lateral legs are brought into engagement with the slots in an interference fit to secure the flexures to the head mounting arms.

2. A system for mounting flexures to head mounting arms as claimed in claim 1 wherein the lateral legs comprise longitudinally extensive areas of reduced material thickness along edges of the lateral legs closest to the longitudinal centerline.

3. A system for mounting flexures to head mounting arms as claimed in claim 2 wherein a pair of flexures are mated with their mounting plates in contact and the pair of flexures are engaged with the slot in the head mounting arm.

4. A system for mounting flexures to head mounting arms as claimed in claim 3 wherein the mounting plate further comprises a wire routing channel in the lateral legs and the mating of the pair of flexures aligns the wire routing channels in both mounting plates to form a wire routing tube for guiding wires connecting the heads to electronic circuitry.

5. A system for mounting flexures to head mounting arms as claimed in claim 1 wherein the mounting plates are formed using the process of chemical etching and a plurality of mounting plates is simultaneously formed attached to a carrier strip.

6. A system for mounting flexures to head mounting arms as claimed in claim 2 wherein the mounting plates are formed using the process of chemical etching and the areas of reduced material thickness are formed using the process of half-etching.

* * * * *

UNITED STATES PATENT AND TRADEMARK OFFICE
CERTIFICATE OF CORRECTION

PATENT NO.  : 5,313,355
DATED       : May 17, 1994
INVENTOR(S) : Tracy M. Hagen

It is certified that error appears in the above-indentified patent and that said Letters Patent is hereby corrected as shown below:

[57], line 3, delete "insert", insert --inserted--
Column 1, line 56, delete "using", insert --uses--
Column 2, line 51, after 1992, insert --now US 5,262,911, issued November 16, 1993--
Column 6, line 40, after 1992, insert --now US 5,262,911, issued November 16, 1993--
Column 6, line 65, delete "plane", insert --plan--
Column 11, line 38, delete "the edges" (second incidence)
Column 11, line 29, delete "comprising", insert --comprises--
Column 12, line 1, after slots, insert --with one slot in each of--.
Column 12, line 2, after slots, delete "with one in each of"
Column 12, line 6, after corresponding, insert --one--

Signed and Sealed this

Eleventh Day of April, 1995

Attest:

Attesting Officer

BRUCE LEHMAN

Commissioner of Patents and Trademarks